US011510118B2

(12) United States Patent
Sun

(10) Patent No.: US 11,510,118 B2
(45) Date of Patent: Nov. 22, 2022

(54) SERVER SWITCHING METHOD AND APPARATUS, AND COMMUNICATIONS SYSTEM

(71) Applicant: HUAWEI TECHNOLOGIES CO., LTD., Guangdong (CN)

(72) Inventor: Dekui Sun, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/881,446

(22) Filed: May 22, 2020

(65) Prior Publication Data
US 2020/0351736 A1 Nov. 5, 2020

Related U.S. Application Data

(63) Continuation of application No. PCT/CN2018/114494, filed on Nov. 8, 2018.

(30) Foreign Application Priority Data

Nov. 24, 2017 (CN) .......................... 201711190960.9

(51) Int. Cl.
*H04W 36/00* (2009.01)
*H04W 76/30* (2018.01)

(52) U.S. Cl.
CPC . *H04W 36/00837* (2018.08); *H04W 36/0055* (2013.01); *H04W 76/30* (2018.02)

(58) Field of Classification Search
CPC ... H04L 65/1083; H04L 29/08; H04L 67/148; H04W 36/0022; H04W 24/04;
(Continued)

(56) References Cited

U.S. PATENT DOCUMENTS 8,380,854 B2   2/2013  Szabo
2005/0176425 A1  8/2005  Kawakami et al.
(Continued)

FOREIGN PATENT DOCUMENTS

CN   1645881 A   7/2005
CN   1809005 A   7/2006
(Continued)

OTHER PUBLICATIONS

3GPP TS 22.186 V15.2.0 (Sep. 2017),3rd Generation Partnership Project;Technical Specification Group Services and System Aspects;Enhancement of 3GPP support for V2X scenarios;Stage 1(Release 15),total 16 pages.
(Continued)

*Primary Examiner* — Margaret G Mastrodonato
(74) *Attorney, Agent, or Firm* — Womble Bond Dickinson (US) LLP

(57) ABSTRACT

This application provides a server switching method and apparatus, and a communications system. The method includes: receiving, by a terminal, a first notification message, where the first notification message includes an address of a second server; sending, by the terminal, to-be-sent service data to a first server and the second server based on the first notification message; receiving, by the terminal, downlink data from the first server; obtaining, by the terminal, data processing indication information; when obtaining the data processing indication information, sending, by the terminal, the to-be-sent service data to the second server; and receiving, by the terminal, downlink data from the second server. The server switching method and apparatus, and the communications system in the embodiments of this application can implement seamless switching, ensure service continuity, avoid service interruption caused when a
(Continued)

terminal switches between servers, and help meet an end-to-end latency requirement.

18 Claims, 7 Drawing Sheets

(58) Field of Classification Search
CPC ............. H04W 36/00; H04W 36/0055; H04W 36/00837; H04W 76/30
See application file for complete search history.

(56) References Cited

U.S. PATENT DOCUMENTS

| | | | |
|---|---|---|---|
| 2007/0168500 A1* | 7/2007 | D'Souza | G06F 15/173 709/224 |
| 2011/0045835 A1 | 2/2011 | Chou et al. | |
| 2012/0190366 A1* | 7/2012 | Keller | H04L 65/1083 455/436 |
| 2012/0307800 A1* | 12/2012 | Wong | H04L 65/607 370/331 |
| 2013/0143570 A1* | 6/2013 | Kapoor | H04W 36/14 455/436 |
| 2017/0006548 A1 | 1/2017 | Guo et al. | |
| 2021/0076455 A1* | 3/2021 | Di Girolamo | H04W 88/005 |

FOREIGN PATENT DOCUMENTS

| | | |
|---|---|---|
| CN | 1885993 A | 12/2006 |
| CN | 101854688 A | 10/2010 |
| CN | 102255875 A | 11/2011 |
| CN | 102577589 A | 7/2012 |
| CN | 104186013 A | 12/2014 |
| CN | 104349507 A | 2/2015 |
| WO | 2017180258 A1 | 10/2017 |

OTHER PUBLICATIONS

3GPP TR 23.785 V14.0.0 (Sep. 2016),3rd Generation Partnership Project; Technical Specification Group Services and System Aspects; Study on architecture enhancements for LTE support of V2X services (Release 14),Total 52 Pages.

Huawei et al.,"Update to procedures to support service continuity in ULCL scenario",SA WG2 Meeting #122 bis S2-175633,Aug. 21-25, 2017, Sophia Antipolis, France,Total 8 Pages.

3GPP TS 22.261 V16.1.0 (Sep. 2017),3rd Generation Partnership Project; TechnicalSpecification Group Services and System Aspects-;Service requirements for the 5G system;Stage 1 (Release 16),Total 52 Pages.

* cited by examiner

SERVER SWITCHING METHOD AND APPARATUS, AND COMMUNICATIONS SYSTEM

CROSS-REFERENCE TO RELATED APPLICATIONS

This application is a continuation of International Application No. PCT/CN2018/114494, filed on Nov. 8, 2018, which claims priority to Chinese Patent Application No. 201711190960.9, filed on Nov. 24, 2017, The disclosures of the aforementioned applications are hereby incorporated by reference in their entireties.

TECHNICAL FIELD

This application relates to the communications field, and more specifically, to a server switching method and apparatus, and a communications system.

BACKGROUND

Ultra-reliable and low latency communications (URLLC) services are introduced in a 5th generation (5G) communications system, and mainly include services that require a low-latency and highly reliable connection, for example, self-driving and industrial automation. For example, in a remote driving scenario stipulated in existing 5G TS22186, a vehicle reports image and sensing information collected by the vehicle to an application server (AS). The AS makes a driving decision (for example, acceleration, deceleration, braking, lane changing, or normal driving based on a current speed and lane) based on the information, and delivers the driving decision to the vehicle to implement remote control on the vehicle. In a remote driving service, it is required that an end-to-end latency between a vehicle and an AS be always kept at 5 milliseconds (ms) to ensure service continuity.

In a current long term evolution (LTE) standard, an anycast (anycast) technology is used for switching between application services. The anycast technology supports only stateless best effort services. In the anycast technology, when a new AS receives a first packet of service data sent by a vehicle, it indicates that the vehicle has been disconnected from an original AS. However, in this case, the new AS is unable to make a driving decision yet, thereby causing substantial service interruption. In this case, service interruption occurs when a vehicle is switched between ASs by using the anycast technology. Therefore, a solution urgently needs to be proposed to ensure service continuity during AS switching.

SUMMARY

This application provides a server switching method and apparatus, and a communications system, to implement a seamless switching, thereby ensuring service continuity, avoiding service interruption caused when a terminal is switched between servers, and helping meet an end-to-end latency requirement.

According to a first aspect, a server switching method is provided. The method is applied to a process in which a terminal is switched from a first server to a second server. The method includes: receiving, by the terminal, a first notification message, where the first notification message includes an address of the second server; sending to-be-sent service data to the first server and the second server based on the first notification message; receiving, by the terminal, downlink data from the first server; obtaining, by the terminal, data processing indication information; when obtaining the data processing indication information, sending, by the terminal, the to-be-sent service data to the second server; and receiving, by the terminal, downlink data from the second server.

By obtaining the data processing indication information, when obtaining the data processing indication information, the terminal sends the to-be-sent service data to the second server, and receives the downlink data from the second server. In this way, before obtaining the data processing indication information, the terminal keeps a service connection to the first server, and also establishes communication with the second service; and after obtaining the data processing indication information, the terminal enables a service connection to the second server, to implement a seamless switching. This ensures service continuity, avoids service interruption caused when the terminal is switched between servers, and helps meet an end-to-end latency requirement.

In one embodiment, when obtaining the data processing indication information, the terminal stops sending the to-be-sent service data to the first server. In this way, the terminal may stop sending service data to the first server, thereby implementing a seamless switching of the terminal and reducing power consumption.

In one embodiment, when obtaining the data processing indication information, the terminal sends a disconnection message to the first server, where the disconnection message is used to instruct the first server to no longer send downlink data to the terminal. In this way, the terminal instructs, by sending the disconnection message, the first server to no longer send downlink data, thereby reducing power consumption of the first server.

In another embodiment, the receiving, by the terminal, a first notification message includes: receiving, by the terminal, the first notification message from a control function entity, where the first notification message further includes duration of a timer; and the obtaining, by the terminal, data processing indication information includes: obtaining, by the terminal, the data processing indication information based on the first notification message, where the data processing indication information is used to indicate that the duration of the timer elapses. Therefore, by setting the timer, the terminal learns, based on the data processing indication information, that the duration of the timer elapses.

In one embodiment, the obtaining, by the terminal, data processing indication information includes: receiving, by the terminal, the data processing indication information from a control function entity. Therefore, the data processing indication information may be sent by the control function entity to the terminal, and an obtaining manner is relatively flexible.

In another embodiment, the obtaining, by the terminal, data processing indication information includes: receiving, by the terminal, the data processing indication information from the second server. Therefore, the data processing indication information may be sent by the second server to the terminal, and an obtaining manner is relatively flexible.

In one embodiment, the second server is determined by the control function entity based on at least one of location information of the terminal, information about a gateway to which the terminal belongs, network information, or server load information.

According to a second aspect, a server switching method is provided. The method is applied to a process in which a terminal is switched from a first server to a second server. The method includes: determining, by a control function entity, the second server; sending, by the control function entity, a first notification message to the terminal, where the first notification message includes an address of the second server, and the first notification message is used to instruct the terminal to send to-be-sent service data to the first server and the second server; and sending, by the control function entity, data processing indication information to the terminal, where the data processing indication information is used to instruct the terminal to release a connection to the first server.

The control function entity sends the data processing indication information to the terminal, so that when obtaining the data processing indication information, the terminal sends the to-be-sent service data to the second server, and receives downlink data from the second server, to implement a seamless switching. This ensures service continuity, avoids service interruption caused when the terminal is switched between servers, and helps meet an end-to-end latency requirement.

In one embodiment, the sending, by the control function entity, data processing indication information to the terminal includes: sending, by the control function entity, the data processing indication information to the terminal based on a second notification message from the second server.

In another embodiment, the sending, by the control function entity, data processing indication information to the terminal includes: sending, by the control function entity, the data processing indication information to the terminal according to a locally configured or preconfigured policy. Therefore, the control function entity may send the data processing indication information to the terminal based on a notification message from the second server or according to a configured policy.

In one embodiment, before the determining, by a control function entity, the second server, the method further includes: receiving, by the control function entity, a trigger message from the first server, where the trigger message is used to instruct to perform server switching for the terminal; and the determining, by a control function entity, the second server includes: determining, by the control function entity, the second server based on the trigger message. Therefore, the control function entity may voluntarily determine a reselected server for the terminal, or may determine a reselected server for the terminal based on triggering of the first server.

In one embodiment, the control function entity determines the second server based on at least one of location information of the terminal, information about a gateway to which the terminal belongs, network information, or server load information.

According to a third aspect, a server switching method is provided. The method is applied to a process in which a terminal is switched from a first server to a second server. The method includes: determining, by a control function entity, the second server; sending, by the control function entity, a first notification message to the terminal, where the first notification message includes an address of the second server, and the first notification message is used to instruct the terminal to send to-be-sent service data to the first server and the second server; receiving, by the second server, the service data from the terminal; and sending, by the second server, data processing indication information to the terminal based on a reception status of the service data, where the data processing indication information is used to instruct the terminal to release a connection to the first server.

The control function entity determines the second server, and sends the first notification message to the second server. The second server receives the service data from the terminal, and sends the data processing indication information to the terminal, where the data processing indication information is used to instruct the terminal to release the connection to the first server. This can implement a seamless switching of the terminal, thereby ensuring service continuity, avoiding service interruption caused when the terminal is switched between servers, and helping meet an end-to-end latency requirement.

In one embodiment, the control function entity determines the second server based on at least one of location information of the terminal, information about a gateway to which the terminal belongs, network information, or server load information.

According to a fourth aspect, a communications system is provided. The communications system is applied to a process in which a terminal is switched from a first server to a second server. The communications system includes: a control function entity, configured to determine the second server, where the control function entity is further configured to send a first notification message to the terminal, the first notification message includes an address of the second server, and the first notification message is used to instruct the terminal to send to-be-sent service data to the first server and the second server; and the second server, configured to receive the service data from the terminal, where the second server is further configured to send a second notification message to the control function entity based on a reception status of the service data, the control function entity is further configured to send data processing indication information to the terminal based on the second notification message, the data processing indication information is used to instruct the terminal to release a connection to the first server, and the second server is further configured to send downlink data to the terminal.

In the communications system in this embodiment of this application, the control function entity determines the second server, and sends the first notification message to the second server; and the second server receives the service data from the terminal, and sends the second notification message to the control function entity, so that the control function entity sends the data processing indication information to the terminal based on the second notification message, where the data processing indication information is used to instruct the terminal to release the connection to the first server. This can implement a seamless switching of the terminal, thereby ensuring service continuity, avoiding service interruption caused when the terminal is switched between servers, and helping meet an end-to-end latency requirement.

In one embodiment, before determining the second server, the control function entity is further configured to: receive a trigger message from the first server, where the trigger message is used to instruct the control function entity to perform server switching for the terminal; and determine the second server based on the trigger message. Therefore, the control function entity may voluntarily determine a reselected server for the terminal, or may determine a reselected server for the terminal based on triggering of the first server.

In one embodiment, the control function entity determines the second server based on at least one of location information of the terminal, information about a gateway to which the terminal belongs, network information, or server load information.

According to a fifth aspect, a communications system is provided. The communications system is applied to a process in which a terminal is switched from a first server to a second server. The communications system includes: a control function entity, configured to determine the second server, where the control function entity is further configured to send a first notification message to the terminal, the first notification message includes an address of the second server, and the first notification message is used to instruct the terminal to send to-be-sent service data to the first server and the second server; and the second server, configured to receive the service data from the terminal, where the second server is further configured to send data processing indication information to the terminal based on a reception status of the service data, and the data processing indication information is used to instruct the terminal to release a connection to the first server.

The control function entity determines the second server, and sends the first notification message to the second server. The second server receives the service data from the terminal, and sends the data processing indication information to the terminal, where the data processing indication information is used to instruct the terminal to release the connection to the first server. This can implement a seamless switching of the terminal, thereby ensuring service continuity, avoiding service interruption caused when the terminal is switched between servers, and helping meet an end-to-end latency requirement.

In one embodiment, the control function entity determines the second server based on at least one of location information of the terminal, information about a gateway to which the terminal belongs, network information, or server load information.

According to a sixth aspect, a server switching apparatus is provided, configured to perform the method on the control function entity side in any one of the foregoing aspects or the possible implementations of the foregoing aspects. Specifically, the apparatus includes a module configured to perform the method on the control function entity side in any one of the foregoing aspects or the possible implementations of the foregoing aspects.

According to a seventh aspect, a server switching apparatus is provided, configured to perform the method on the second server side in any one of the foregoing aspects or the possible implementations of the foregoing aspects. Specifically, the apparatus includes a module configured to perform the method on the second server side in any one of the foregoing aspects or the possible implementations of the foregoing aspects.

According to an eighth aspect, an apparatus is provided, configured to perform the method according to any one of the first aspect or the possible implementations of the first aspect. Specifically, the apparatus includes a module configured to perform the method in any one of the first aspect or the possible implementations of the first aspect. The apparatus may be a terminal, or may be a chip.

According to a ninth aspect, a server switching apparatus is provided. The apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the apparatus to perform the method on the control function entity side in any one of the foregoing aspects or the possible implementations of the foregoing aspects.

According to a tenth aspect, a server switching apparatus is provided. The apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the apparatus to perform the method on the second server side in any one of the foregoing aspects or the possible implementations of the foregoing aspects.

According to an eleventh aspect, an apparatus is provided. The apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the apparatus to perform the method in any one of the first aspect or the possible implementations of the first aspect. The apparatus may be a terminal, or may be a chip.

According to a twelfth aspect, a computer readable storage medium is provided. The computer readable storage medium stores a program. The program enables a control function entity to perform the method on the control function entity side in any one of the foregoing aspects or the possible implementations of the foregoing aspects.

According to a thirteenth aspect, a computer readable storage medium is provided. The computer readable storage medium stores a program. The program enables a second server to perform the method on the second server side in any one of the foregoing aspects or the possible implementations of the foregoing aspects.

According to a fourteenth aspect, a computer readable storage medium is provided. The computer readable storage medium stores a program. The program enables a terminal to perform the server switching method in any one of the first aspect or the implementations of the first aspect.

According to a fifteenth aspect, a communications chip is provided. The communications chip stores an instruction. When the instruction runs on a computer device, the communications chip is enabled to perform the method in any one of the possible implementations of the foregoing aspects.

According to a sixteenth aspect, a computer program product including an instruction is provided. When the instruction runs on a computer, the computer is enabled to perform the method in any one of the foregoing aspects or the possible implementations of the foregoing aspects.

DESCRIPTION OF EMBODIMENTS

The following describes technical solutions of this application with reference to accompanying drawings.

The technical solutions in the embodiments of this application may be applied to various communications systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, another system in the future, a new radio (NR) system, and a vehicle-to-everything (V2X) internet of vehicles system.

Figure 1:
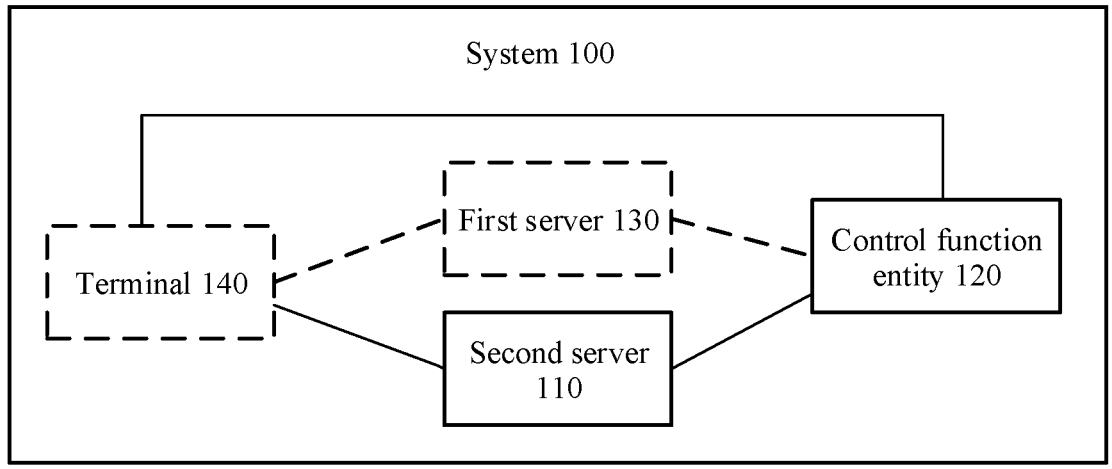
FIG. 1 is a schematic architectural diagram of a system to which an embodiment of this application is applied.

FIG. 1 is a schematic architectural diagram of a system to which an embodiment of this application is applied. As shown in FIG. 1, the system 100 includes a second server 110 and a control function entity 120. In one embodiment, the system 100 further includes a terminal 140 and a first server 130. In one embodiment, the terminal 140 may be switched from the first server 130 to the second server 110.

The system 100 may be configured to perform a server switching method in an embodiment of this application.

In one embodiment, the system 100 is applied to a process in which the terminal 140 is switched from the first server 130 to the second server 110, and specifically includes: the control function entity 120, configured to determine the second server 110, where the control function entity 120 is further configured to send a first notification message to the terminal 140, the first notification message includes an address of the second server 110, and the first notification message is used to instruct the terminal 140 to send to-be-sent service data to the first server 130 and the second server 110; and the second server 110, configured to receive the service data from the terminal 140, where the second server 110 is further configured to send a second notification message to the control function entity 120 based on a reception status of the service data, the control function entity 120 is further configured to send data processing indication information to the terminal 140 based on the second notification message, the data processing indication information is used to instruct the terminal 140 to release a connection to the first server 130, and the second server 110 is further configured to send downlink data to the terminal 140. Therefore, in the system 100, the second server receives the service data from the terminal, and sends the second notification message to the control function entity, so that the control function entity sends the data processing indication information to the terminal based on the second notification message, where the data processing indication information is used to instruct the terminal to release the connection to the first server. This can implement a seamless switching of the terminal, thereby ensuring service continuity, avoiding service interruption caused when the terminal is switched between servers, and helping meet an end-to-end latency requirement.

In another embodiment, the system 100 specifically includes: the control function entity 120, configured to determine the second server 110, where the control function entity 120 is further configured to send a first notification message to the terminal 140, the first notification message includes an address of the second server 110, and the first notification message is used to instruct the terminal 140 to send to-be-sent service data to the first server 130 and the second server 110; and the second server 110, configured to receive the service data from the terminal 140, where the second server 110 is further configured to send data processing indication information to the terminal 140 based on a reception status of the service data, and the data processing indication information is used to instruct the terminal 140 to release a connection to the first server 130. Therefore, in the system 100, the second server receives the service data from the terminal, and directly sends the data processing indication information to the terminal based on the reception status of the service data, where the data processing indication information is used to instruct the terminal to release the connection to the first server. This can implement a seamless switching of the terminal, thereby ensuring service continuity, avoiding service interruption caused when the terminal is switched between servers, and helping meet an end-to-end latency requirement.

In one embodiment, the second server 110 and the control function entity 120 in FIG. 1 may be implemented by one entity device, or may be jointly implemented by a plurality of entity devices, or may be one logical function module in one entity device. This is not limited in this embodiment of this application.

It should be noted that the control function entity, the first server, the second server, and the like in FIG. 1 are merely names, and the names do not constitute a limitation on the devices. In a 5G network or another network in the future, network elements or entities corresponding to a control function entity, a second server, and a first server may have other names. This is not specifically limited in this embodiment of this application. For example, the control function entity may be alternatively replaced with a V2X control function entity or a cloud AS entity. A collective description is provided herein, and details are not repeated below.

In one embodiment, in actual deployment, the control function entity 120 and the second server 110 in the system 100 may belong to a same operator, or may be deployed separately. This is not limited in this embodiment of this application.

In one embodiment, the control function entity 120 and the second server 110 in the system 100 may exist in a form of an entity, or may be implemented in a form of a software module. This is not limited in this embodiment of this application.

The terminal in the embodiments of this application may be user equipment, an access terminal, a terminal in V2X communication, a user unit, a user station, a mobile station, a mobile station, a remote station, a remote terminal, a mobile device, a user terminal, a terminal device, a wireless communications device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application. The terminal may alternatively be a V2X device, for example, a vehicle or an on-board unit (OBU) in a vehicle.

The terminal in the embodiments of this application is connected to a radio access network (RAN) device in a wireless manner, and the radio access network device is connected to a core network device (not shown in FIG. 1) in a wireless or wired manner. The core network device and the radio access network device may be different separate physical devices, or a function of the core network device and a logical function of the radio access network device may be integrated to one physical device, or some functions of the core network device and some functions of the radio access network device may be integrated to one physical device. The terminal may be in a fixed location, or may be mobile.

The radio access network device is an access device used by the terminal to access the mobile communications system in a wireless manner; and may be a NodeB NodeB, an evolved NodeB eNodeB, a gNB gNB in a 5G mobile communications system, a base station in a future mobile communications system, an access node in a Wi-Fi system, or the like, or may be a radio controller in a cloud radio access network (CRAN) scenario. Alternatively, the access network device may be a relay station, an access point, a vehicle-mounted device, a wearable device, a network device in a future 5G network, a network device in a future evolved PLMN network, or the like. A specific technology and a specific device form used for the radio access network device are not limited in the embodiments of this application.

The core network device includes, for example, a mobility management entity (MME) or a broadcast multicast service center (BMSC); or may include a corresponding function entity in a 5G NR system, for example, a core network control plane (CP) or user plane (UP) function, for example, a session management function (SMF) or an access and mobility management function (AMF). A core network control plane may also be understood as a core network control plane function (CPF) entity.

V2X communication means that a vehicle may obtain road condition information or receive information in a timely manner through vehicle-to-vehicle (V2V) communication, vehicle-to-infrastructure (V2I) communication, vehicle-to-pedestrian (V2P) communication, vehicle-to-network (V2N) communication, or the like. Using the most common V2V and V2I as examples, a vehicle may broadcast, to a nearby vehicle through V2V communication, information about the vehicle, for example, a driving speed, a driving direction, a specific location, or whether emergency braking is performed; and the nearby vehicle obtains the information, so that a driver may better sense a traffic condition, to pre-determine a dangerous situation to avoid the situation in a timely manner. In one embodiment, for the V2I communication, in addition to exchange of the foregoing safety information, roadside infrastructure may further provide a vehicle with various types of service information, data network access, and the like. Functions such as non-stop toll collection and in-vehicle entertainment greatly improve traffic intelligence. Generally, a network used for V2X communication is referred to as an internet of vehicles.

The radio access network device and the terminal may be deployed on land, including an indoor, outdoor, handheld, or vehicle-mounted scenario; or may be deployed on water; or may be deployed on an airplane, a balloon, or a satellite in the air. Application scenarios of the radio access network device and the terminal are not limited in the embodiments of this application.

The embodiments of this application are applicable to downlink signal transmission, or is applicable to uplink signal transmission, or is applicable to device-to-device (D2D) signal transmission. For the downlink signal transmission, a sending device is a radio access network device, and a corresponding receiving device is a terminal. For the uplink signal transmission, a sending device is a terminal, and a corresponding receiving device is a radio access network device. For the D2D signal transmission, a sending device is a terminal, and a corresponding receiving device is also a terminal. A signal transmission direction is not limited in the embodiments of this application.

Communication between the radio access network device and the terminal and between the terminals may be performed by using a licensed spectrum (licensed spectrum), or communication may be performed by using an unlicensed spectrum (unlicensed spectrum), or communication may be performed by using both a licensed spectrum and an unlicensed spectrum. Communication between the radio access network device and the terminal and between the terminals may be performed by using a spectrum below 6 Gigahertz (GHz), or communication may be performed by using a spectrum above 6 GHz, or communication may be performed by using both a spectrum below 6 GHz and a spectrum above 6 GHz. A spectrum resource used between the radio access network device and the terminal is not limited in this embodiment of this application.

In one embodiment, the system 100 shown in FIG. 1 may be applied to a 5G network or another possible network in the future. This is not specifically limited in this embodiment of this application.

Figure 2:
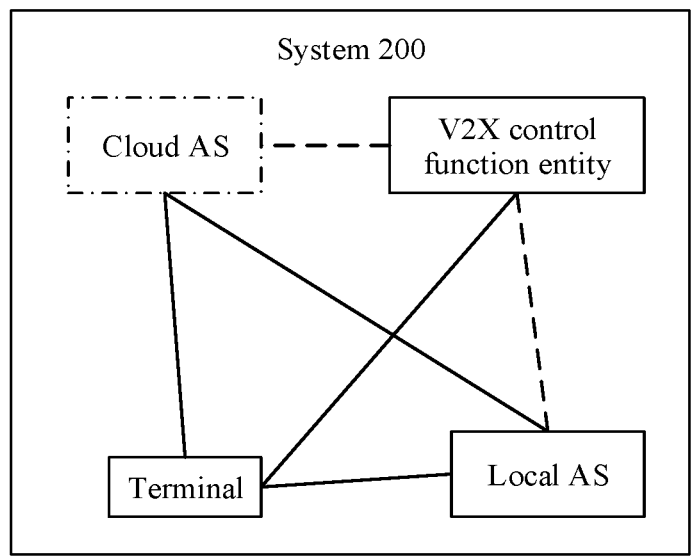
FIG. 2 is a diagram of a scenario to which an embodiment of this application is applied.

When the system 100 shown in FIG. 1 is applied to the 5G network, as shown in FIG. 2, for example, the control function entity 120 may be a V2X control function entity or a cloud AS in 5G, and the first server 130 or the second server 110 may be a local AS.

FIG. 2 is a diagram of a scenario to which an embodiment of this application is applied. As shown in FIG. 2, system 200 includes a local application server (AS) and a V2X control function entity. In one embodiment, the system 200 may further include a terminal and a cloud AS. The cloud AS may exist or not exist. An application server AS communicates with the terminal through a network. For a low-latency service, the local AS is used for the terminal. The cloud AS may provide the terminal with information such as traffic road condition, and may further notify the terminal of an address of the local AS. The V2X control function entity is responsible for authenticating the terminal. In one embodiment, the V2X control function entity may further notify the terminal of an address of the AS.

It should be noted that the V2X control function entity, the local AS, the cloud AS, and the like in FIG. 2 are merely names, and the names do not constitute a limitation on the devices. In a 5G network or another network in the future, network elements or entities corresponding to the V2X control function entity, the local AS, and the cloud AS may have other names. This is not specifically limited in this embodiment of this application. For example, the V2X control function entity may be alternatively replaced with a V2X control function or a cloud AS. A collective description is provided herein, and details are not repeated below.

Figure 3:
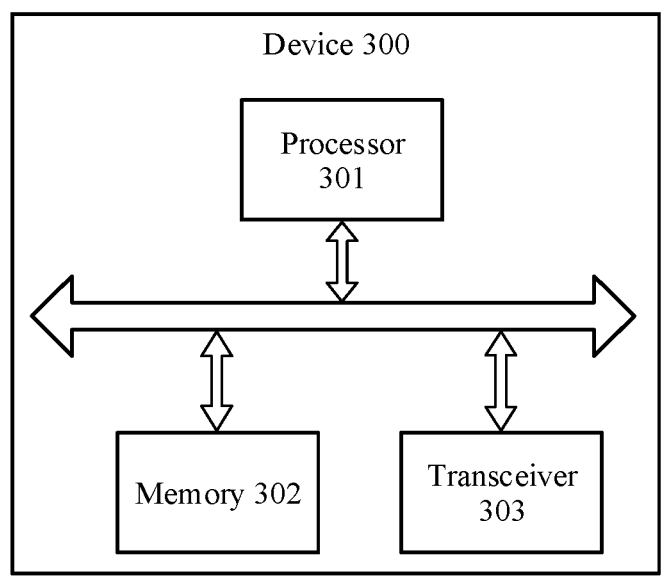
FIG. 3 is a schematic block diagram of a computer device to which an embodiment of this application is applied.

FIG. 3 is a schematic block diagram of a computer device 300 (or a server switching apparatus) to which an embodiment of this application is applied. The second server 110, the control function entity 120, the first server 130, or the terminal 140 in FIG. 1 may be implemented by the computer device in FIG. 3. Alternatively, the terminal, the local AS, the cloud AS, or the V2X control function entity in FIG. 2 may be implemented by the computer device in FIG. 3.

As shown in FIG. 3, the computer device includes a processor 301, a memory 302, and a transceiver 303.

The processor 301, the memory 302, and the transceiver 303 communicate with each other through an internal connection, to transfer control and/or data signals.

It may be understood that, although not shown, the computer device 300 may further include another apparatus, such as an input apparatus, an output apparatus, or a battery.

In one embodiment, in some embodiments, the memory 302 may store an executable instruction used for performing a method in an embodiment of this application. The processor 301 may execute the instruction stored in the memory 302 and cooperate with other hardware (for example, the transceiver 303), to perform operations in the following method. For a specific working process and beneficial effects, refer to descriptions in the following method embodiment.

The method disclosed in the embodiments of this application may be applied to a processor or may be implemented by a processor. The processor may be an integrated circuit chip and has a signal processing capability. In an implementation process, operations in the foregoing methods can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the operations, and logical block diagrams that are disclosed in the embodiments of this application. The general-purpose processor may be a microprocessor, or the processor may be any conventional processor or the like. Operations of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, or a register. The storage medium is located in the memory, and a processor reads instructions in the memory and completes the operations in the foregoing methods in combination with hardware of the processor.

The computer device 300 may be a general-purpose computer device or a dedicated computer device. During specific implementation, the computer device 300 may be a desktop computer, a portable computer, a network server, a palmtop computer (PDA), a mobile phone, a tablet computer, a wireless terminal device, a communications device, an embedded device, or a device with a structure similar to that in FIG. 3. A type of the computer device 300 is not limited in this embodiment of this application.

Figure 4:
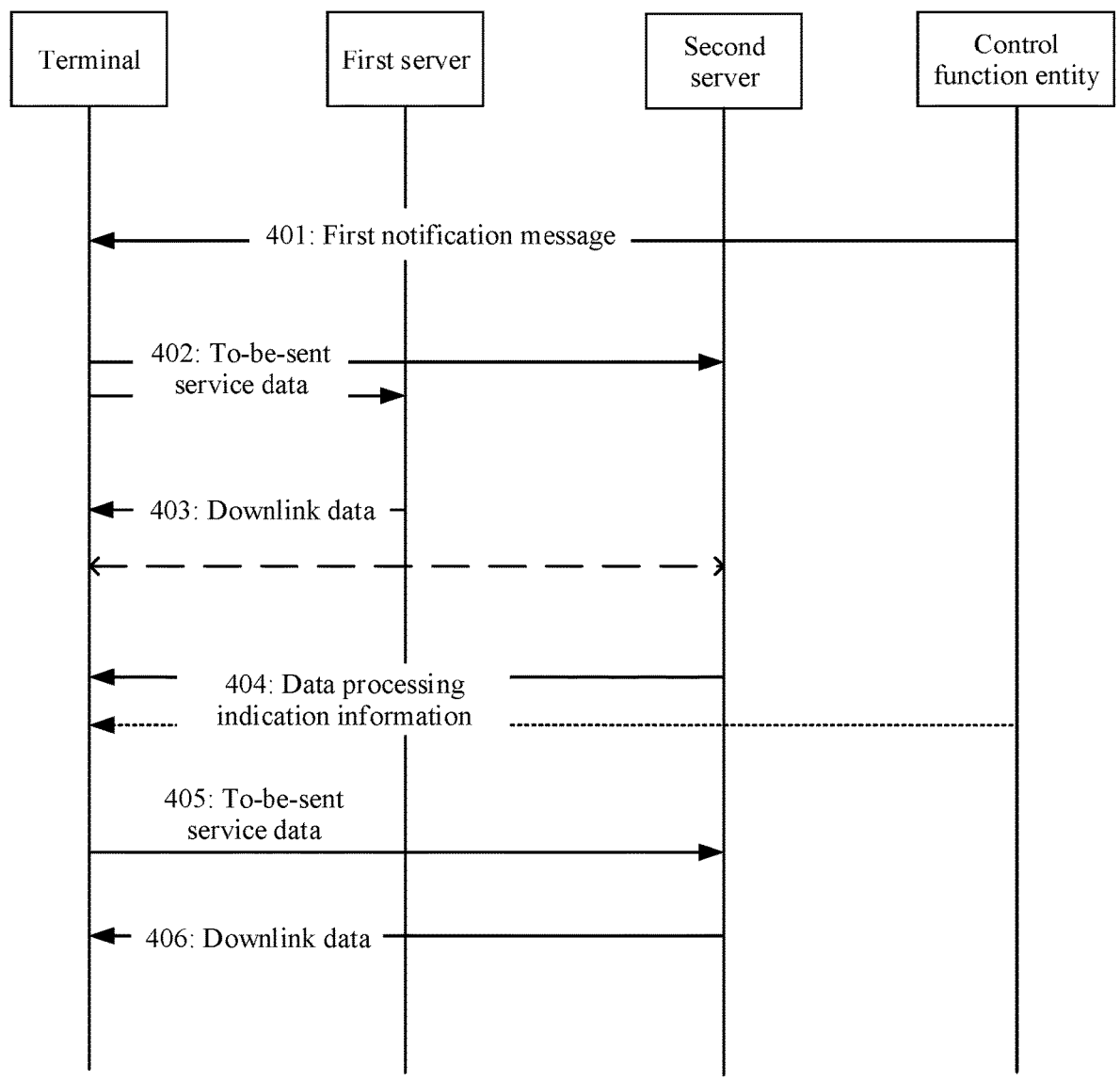
FIG. 4 is a schematic flowchart of a server switching method according to an embodiment of this application.

FIG. 4 is a schematic flowchart of a server switching method according to an embodiment of this application. This embodiment of this application may be applied to an internet of vehicles scenario. Specifically, the method is applied to a process in which a terminal is switched from a first server to a second server. In one embodiment, in this embodiment of this application, a server may be an AS, and a control function entity may be a V2X CF or a cloud AS. As shown in FIG. 4, the method includes the following operations.

Operation 401: The terminal receives a first notification message, where the first notification message includes an address of the second server.

In one embodiment, the first notification message may be sent by the control function entity.

Operation 402: The terminal sends to-be-sent service data to the first server and the second server based on the first notification message.

In one embodiment, the terminal may replicate the to-be-sent service data and send copies to the first server and the second server respectively.

Operation 403: The first server sends downlink data to the terminal. Correspondingly, the terminal receives the downlink data from the first server.

Herein, the terminal uses the downlink data sent by the first server. Even if the terminal receives downlink data sent by the second server, the terminal caches or discards the downlink data sent by the second server, without using the downlink data sent by the second server.

Operation 404: The terminal obtains data processing indication information.

In one embodiment, the data processing indication information may be sent by the control function entity, or may be sent by the second server, or may be determined by the terminal based on duration of a timer.

Operation 405: When obtaining the data processing indication information, the terminal sends the to-be-sent service data to the second server.

A difference from operation 402 lies in that the terminal no longer sends the service data to both the first server and the second server, but sends the service data only to the second server.

It should be noted that the to-be-sent service data in operation 402 and the to-be-sent service data in operation 405 are different service data.

Herein, the second server has learned sufficient information about the terminal, is capable of controlling the terminal, and can take over the terminal.

Operation 406: The second server sends downlink data to the terminal. Correspondingly, the terminal receives the downlink data from the second server.

A difference between operation 406 and operation 403 lies in that, in operation 406, the terminal uses the downlink data sent by the second server.

Therefore, in the server switching method in this embodiment of this application, by obtaining the data processing indication information, when obtaining the data processing indication information, the terminal sends the to-be-sent service data to the second server, and receives the downlink data from the second server. In this way, before obtaining the data processing indication information, the terminal keeps a service connection to the first server, and also establishes communication with the second service; and after obtaining the data processing indication information, the terminal enables a service connection to the second server, to implement a seamless switching. This ensures service continuity, avoids service interruption caused when a terminal is switched between servers, and helps meet an end-to-end latency requirement.

In one embodiment, when obtaining the data processing indication information, the terminal stops sending the to-be-sent service data to the first server.

Specifically, when or after obtaining the data processing indication information, the terminal stops sending the to-be-sent service data to the first server. Further, the terminal sends the to-be-sent service data to the second server, and the second server takes over a service for the terminal, that is, the terminal releases a service connection to the first server and enables a service connection to the second server.

Alternatively, in one embodiment, when obtaining the data processing indication information, the terminal sends a disconnection message to the first server, where the disconnection message is used to instruct the first server to no longer send downlink data to the terminal.

Specifically, when or after obtaining the data processing indication information, the terminal sends the disconnection message to the first server, so that the first server no longer sends downlink data to the terminal. Further, the terminal sends the to-be-sent service data to the second server, and the second server takes over a service for the terminal, that is, the terminal releases a service connection to the first server and enables a service connection to the second server.

In this embodiment of this application, the terminal may obtain the data processing indication information in a plurality of manners. The following provides respective descriptions.

Manner 1: Operation 401 includes: The terminal receives the first notification message from the control function entity, where the first notification message further includes the duration of the timer.

Correspondingly, operation 404 includes: The terminal obtains the data processing indication information based on the first notification message, where the data processing indication information is used to indicate that the duration of the timer elapses.

Specifically, the control function entity sends the first notification message to the terminal, where the first notification message may further include the duration of the timer; and after the duration of the timer elapses, the terminal sends the to-be-sent service data to the second server.

Manner 2: Operation 404 includes: The terminal receives the data processing indication information from the control function entity.

For example, the control function entity sends the data processing indication information to the terminal when the second server notifies the control function entity that the second server is capable of controlling the terminal or is properly controlling the terminal, or when a data amount of uplink data on the second server that comes from the terminal has satisfied a predefined condition.

Manner 3: Operation 404 includes: The terminal receives the data processing indication information from the second server.

For example, the second server directly sends the data processing indication information to the terminal when the second server is capable of controlling the terminal or is properly controlling the terminal, or when a data amount of uplink data on the second server that comes from the terminal has satisfied a predefined condition.

To sum up, the data processing indication information obtained by the terminal may come from different channels. It should be understood that the foregoing three manners are used only as an example for description herein, and do not constitute a limitation on this embodiment of this application.

Figure 5:
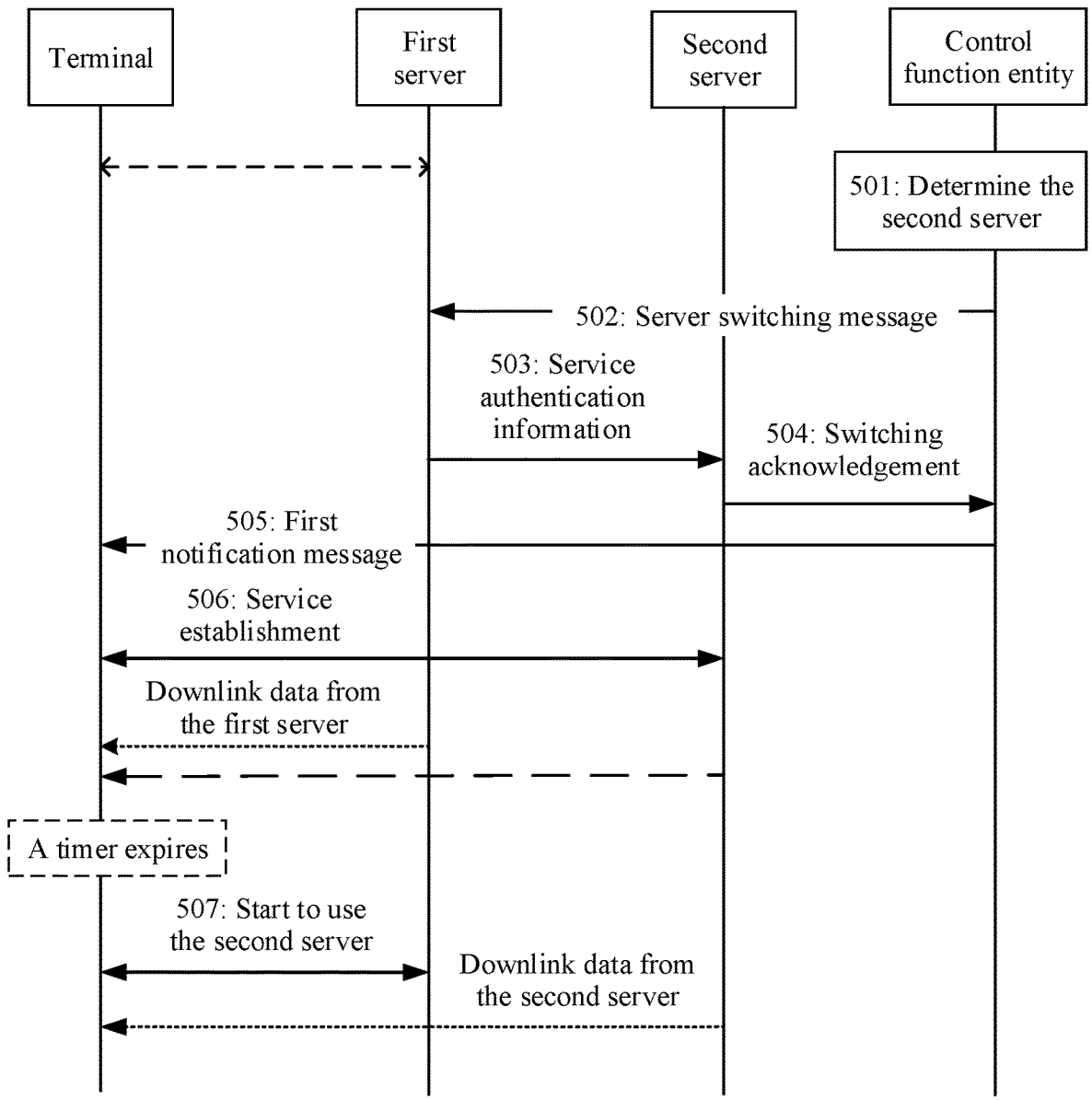
FIG. 5 is a schematic flowchart of a server switching method according to another embodiment of this application.

With reference to FIG. 5, the following describes a server switching method according to another embodiment of this application. It should be understood that operations or concepts similar to those in FIG. 4 are not described again. FIG. 5 is a schematic flowchart of a server switching method according to another embodiment of this application. This embodiment of this application may be applied to an internet of vehicles scenario. Specifically, the method is applied to a process in which a terminal is switched from a first server to a second server. In one embodiment, in this embodiment of this application, a server may be an AS, and a control function entity may be a V2X CF or a cloud AS. It should be noted that a dashed line before operation 501 indicates that the terminal has established communication with the first server. As shown in FIG. 5, the method includes the following operations.

Operation 501: The control function entity determines the second server.

In one embodiment, the control function entity may determine the second server based on at least one of location information of the terminal, information about a gateway to which the terminal belongs, network information, or server load information. The gateway to which the terminal belongs may be a control plane CP gateway, or may be a user plane UPF gateway. The server load information may include load information of the first server and/or load information of the second server.

Specifically, the control function entity reselects a server for the terminal, and selects the second server as a server to which the terminal is to be switched. A server may be reselected based on at least one of the following factors:

(1) A network side (a specific network element may be an SW node or an AMF node) notifies the control function entity of at least one of a location of the gateway to which the terminal belongs, a location of the terminal, and an address of the terminal. Correspondingly, the control function entity determines, based on the address of the terminal, the first server that is currently in a communication connection to the terminal, and reselects the second server for the terminal based on the location of the gateway to which the terminal belongs, a location of a new gateway to which the terminal belongs after the terminal moves, and a location of the terminal after the terminal moves.

(2) When the first server is overloaded or is faulty, the first server sends a trigger message to the control function entity, where the trigger message is used to instruct the control function entity to perform server switching for the terminal. Correspondingly, the control function entity reselects the second server for the terminal based on the trigger message from the first server.

Operation 502: The control function entity sends a server switching message to the first server, where the server switching message carries information such as an address of the second server and the address of the terminal. Correspondingly, the first server receives the server switching message.

Operation 503: The first server sends service authentication information to the second server based on the server switching message.

Specifically, the first server finds context information of the terminal based on the address of the terminal. The context information of the terminal is locally stored on the first server. The context information includes the service authentication information and the like. The first server sends the information to the second server, so that the second server prepares for taking over a service for the terminal.

Operation 504: The second server sends a switching acknowledgement to the control function entity. Correspondingly, the control function entity receives the switching acknowledgement.

Specifically, the second server establishes a context of the terminal based on the service authentication information, synchronizes data with the first server, and sends the switching acknowledgement to the control function entity. The switching acknowledgement is used to notify the control function entity that the second server is ready to take over the service for the terminal.

Operation 505: The control function entity sends a first notification message to the terminal, where the first notification message includes the address of the second server, and the first notification message is used to instruct the terminal to send to-be-sent service data to the first server and the second server. Correspondingly, the terminal receives the first notification message.

In one embodiment, in operation 505, the first notification message may further include duration of a timer. The control function entity determines the duration of the timer based on at least one of the following factors:

(1) A service requirement of the terminal. For example, for a remote driving service, a vehicle is not allowed to lose control, that is, there needs to always be an available server that can control the vehicle. For this service, a timer setting principle is that the terminal is allowed to release a connection to the first server only after the second server has learned sufficient data and is capable of controlling the terminal. For example, the timer is set to 10s.

(2) A static configuration. For example, local configuration is performed on the control function entity. To be specific, a service provider configures the duration of the timer on the control function entity based on a service attribute, so that the control function entity directly obtains the duration of the timer locally and delivers the duration of the timer to the terminal.

In one embodiment, the terminal obtains data processing indication information based on the duration of the timer, where the data processing indication information is used to indicate that the duration of the timer elapses.

Alternatively, the first notification message may not carry duration of a timer, and the control function entity directly sends data processing indication information to the terminal.

Operation 506: The terminal establishes service communication with the second server based on the address of the second server.

Specifically, when receiving the first notification message, the terminal simultaneously sends uplink data to the first server and the second server. For downlink data, the terminal uses downlink data sent by the first server, and caches or discards downlink data sent by the second server. In other words, in this case, although the terminal has established communication with both the first server and the second server, the terminal uses the downlink data sent by the first server.

Herein, after obtaining the duration of the timer, the terminal may start the timer, and perform operation 507 when the timer expires.

Operation 507: The terminal starts to use the second server when the timer expires.

The terminal obtains the data processing indication information based on the duration of the timer included in the first notification message, where the data processing indication information is used to indicate that the duration of the timer elapses. In this case, the terminal releases the connection to the first server, starts to use the second server, and uses the downlink data sent by the second server.

In one embodiment, the terminal may not immediately stop using the first server, so that the terminal can fall back to the first server when the second server becomes faulty, thereby ensuring stability of a communications system. This is not limited in this embodiment of this application.

Figure 6:
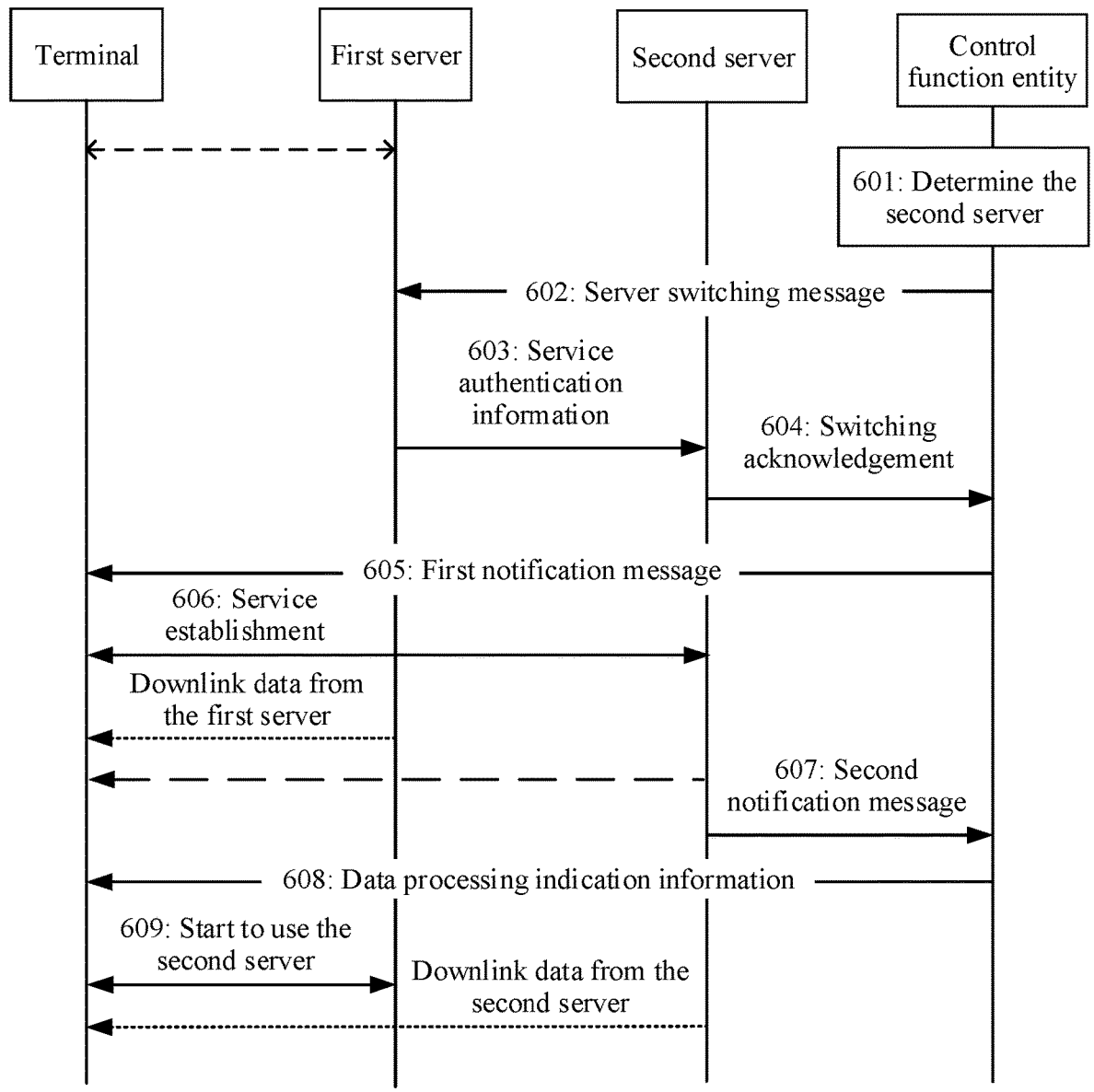
FIG. 6 is a schematic flowchart of a server switching method according to still another embodiment of this application.

In one embodiment, the first notification message may alternatively not include duration of a timer. In one embodiment, the data processing indication information obtained by the terminal may be sent by the control function entity. The following provides descriptions with reference to a flowchart in FIG. 6. In one embodiment, a process in FIG. 6 may be performed by the system 100 in FIG. 1 or the system 200 in FIG. 2. This is not limited in this embodiment of this application. Operation 601 to operation 606 in FIG. 6 are similar to operation 501 to operation 506 in FIG. 5. Refer to the foregoing descriptions. For brevity, details are not described herein again. In operation 605 in FIG. 6, the first notification message does not include duration of a timer. It should be noted that a dashed line before operation 601 indicates that the terminal has established communication with the first server. As shown in FIG. 6, the method further includes the following operations.

Operation 607: The second server sends a second notification message to the control function entity based on a reception status of the service data. Correspondingly, the control function entity receives the second notification message from the second server, where the second notification message indicates that the second server is ready to take over a service for the terminal.

Specifically, the second server has learned sufficient service data, for example, can make a control decision based on data at a current moment and data in last 2 seconds. In this case, the second server sends the second notification message to the control function entity.

Operation 608: The control function entity sends data processing indication information to the terminal, where the data processing indication information is used to instruct the terminal to release a connection to the first server. Correspondingly, the terminal receives the data processing indication information from the control function entity.

In one embodiment, operation 608 includes: The control function entity may send the data processing indication information to the terminal based on the second notification message; or in one embodiment, the control function entity may send the data processing indication information to the terminal according to a locally configured or preconfigured policy; or the control function entity sends the data processing indication information to the terminal after a transition time elapses, for example, after the transition time elapses, an amount of data on the second server satisfies a predefined condition.

In one embodiment, the data processing indication information may be alternatively used to indicate that the second server is capable of taking over the terminal, that is, is capable of controlling the terminal.

Operation 609: The terminal starts to use the second server.

In one embodiment, in this case, the terminal releases the connection to the first server, starts to use the second server, and uses downlink data sent by the second server. Alternatively, in one embodiment, the terminal may not immediately stop using the first server, so that the terminal can fall back to the first server when the second server becomes faulty, thereby ensuring stability of a communications system. This is not limited in this embodiment of this application.

In this embodiment of this application, the control function entity sends the data processing indication information to the terminal, so that when obtaining the data processing indication information, the terminal sends the to-be-sent service data to the second server, and receives the downlink data from the second server, to implement a seamless switching. This ensures service continuity, avoids service interruption caused when the terminal is switched between servers, and helps meet an end-to-end latency requirement.

Figure 7:
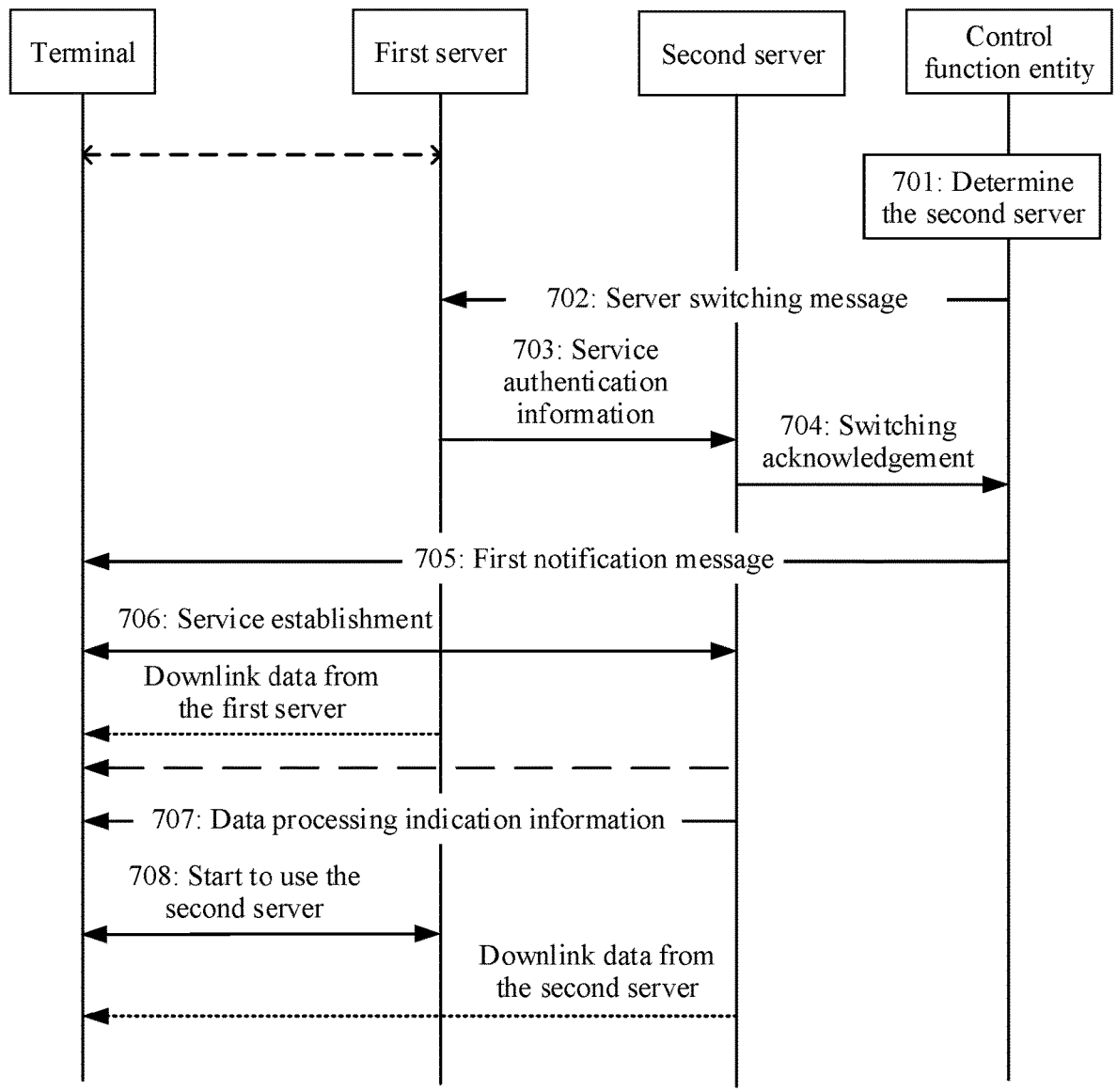
FIG. 7 is a schematic flowchart of a server switching method according to yet another embodiment of this application.

In one embodiment, the data processing indication information obtained by the terminal may be sent by the second server. The following provides descriptions with reference to a flowchart in FIG. 7. In one embodiment, a process in FIG. 7 may be performed by the system 100 in FIG. 1 or the system 200 in FIG. 2. This is not limited in this embodiment of this application. Operation 701 to operation 706 in FIG. 7 are similar to operation 501 to operation 506 in FIG. 5. Refer to the foregoing descriptions. For brevity, details are not described herein again. In operation 705 in FIG. 7, the first notification message does not include duration of a timer. It should be noted that a dashed line before operation 701 indicates that the terminal has established communication with the first server. As shown in FIG. 7, the method further includes the following operations.

Operation 707: The second server sends data processing indication information to the terminal, where the data processing indication information is used to instruct the terminal to release a connection to the first server. Correspondingly, the terminal receives the data processing indication information from the second server.

Specifically, the second server may send the data processing indication information to the terminal based on a reception status of the service data or after an amount of uplink data received from the terminal satisfies a predefined condition.

In one embodiment, the data processing indication information may be alternatively used to indicate that the second server is capable of taking over the terminal, that is, is capable of controlling the terminal.

Operation 708: The terminal starts to use the second server.

In one embodiment, in this case, the terminal releases the connection to the first server, starts to use the second server, and uses downlink data sent by the second server. Alternatively, in one embodiment, the terminal may not immediately stop using the first server, so that the terminal can fall back to the first server when the second server becomes faulty, thereby ensuring stability of a communications system. This is not limited in this embodiment of this application.

In this embodiment of this application, the second server sends the data processing indication information to the terminal, so that when obtaining the data processing indication information, the terminal sends the to-be-sent service data to the second server, and receives the downlink data from the second server, to implement a seamless switching. This ensures service continuity, avoids service interruption caused when the terminal is switched between servers, and helps meet an end-to-end latency requirement.

It should be understood that, the examples in FIG. 4 to FIG. 7 are only for ease of understanding the embodiments by a person skilled in the art, and are not intended to limit the embodiments of this application to a specific scenario in the examples. Definitely, a person skilled in the art can make various equivalent modifications or changes based on the examples shown in FIG. 4 to FIG. 7, and such modifications or changes also fall within the scope of the embodiments of this application.

The foregoing describes the server switching method according to the embodiments of this application. The following describes an apparatus according to an embodiment of this application.

Figure 8:
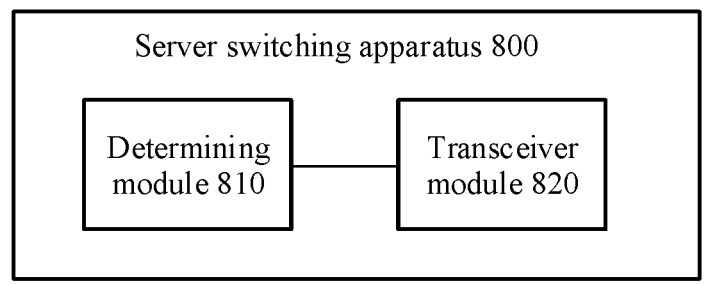
FIG. 8 is a schematic structural diagram of a server switching apparatus according to an embodiment of this application.

FIG. 8 is a schematic structural diagram of a server switching apparatus 800 according to an embodiment of this application. In one embodiment, a specific form of the apparatus 800 may be a general-purpose computer device or a chip in the general-purpose computer device. This is not limited in this embodiment of this application. The apparatus 800 is applied to a process in which a terminal is switched from a first server to a second server. The apparatus 800 is a control function entity, and the control function entity includes:

a determining module 810, configured to determine the second server; and a transceiver module 820, configured to send a first notification message to the terminal, where the first notification message includes an address of the second server, and the first notification message is used to instruct the terminal to send to-be-sent service data to the first server and the second server; where the transceiver module 820 is further configured to send data processing indication information to the terminal, and the data processing indication information is used to instruct the terminal to release a connection to the first server.

In one embodiment, that the transceiver module 820 is configured to send the data processing indication information to the terminal specifically includes: sending the data processing indication information to the terminal based on a second notification message from the second server.

In one embodiment, that the transceiver module 820 is configured to send the data processing indication information to the terminal specifically includes: sending the data processing indication information to the terminal according to a locally configured or preconfigured policy.

In one embodiment, the transceiver module 820 is further configured to receive a trigger message from the first server, where the trigger message is used to instruct the control function entity to perform server switching for the terminal. Correspondingly, that the determining module 810 is configured to determine the second server specifically includes: determine the second server based on the trigger message.

It should be understood that the server switching apparatus 800 according to this embodiment of this application may be corresponding to the method on the control function entity side in the foregoing method embodiment, and the foregoing and other management operations and/or functions of the modules in the apparatus 800 are intended to implement corresponding operations of the method on the control function entity side in the foregoing method embodiment, and therefore can also implement beneficial effects in the foregoing method embodiment. For brevity, details are not described herein.

It should be further understood that in this embodiment, the server switching apparatus 800 is presented in a form of a functional module. The "module" herein may be an application-specific integrated circuit ASIC, a circuit, a processor and a memory that execute one or more software or firmware programs, an integrated logic circuit, and/or another component that can provide the foregoing functions. In a simple embodiment, a person skilled in the art may figure out that the server switching apparatus 800 may be in a form shown in FIG. 3. The determining module 810 may be implemented by the processor 301 and the memory 302 shown in FIG. 3. The transceiver module 820 may be implemented by the transceiver 303 shown in FIG. 3. Specifically, a processor is implemented by executing a computer program stored in a memory. In one embodiment, when the apparatus 800 is the chip, a function and/or an implementation process of the transceiver module 820 may alternatively be implemented by a pin, a circuit, or the like. In one embodiment, the memory is a storage unit in the chip, for example, a register or a cache. The storage unit may alternatively be a storage unit, such as the memory 302 shown in FIG. 3, that is in the computer device and that is located outside the chip. A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 9:
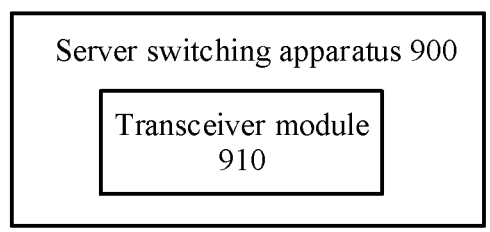
FIG. 9 is a schematic structural diagram of a server switching apparatus according to another embodiment of this application.

FIG. 9 is a schematic structural diagram of a server switching apparatus 900 according to another embodiment of this application. In one embodiment, a specific form of the apparatus 900 may be a general-purpose computer device or a chip in the general-purpose computer device. This is not limited in this embodiment of this application. The apparatus 900 is applied to a process in which a terminal is switched from a first server to a second server. The apparatus 900 is the second server, and the apparatus 900 includes:

a transceiver module 910, configured to receive service data from the terminal; where the transceiver module 910 is further configured to send data processing indication information to the terminal based on a reception status of the service data, and the data processing indication information is used to instruct the terminal to release a connection to the first server.

It should be understood that the server switching apparatus 900 according to this embodiment of this application may be corresponding to the method on the second server side in the foregoing method embodiment, and the foregoing and other management operations and/or functions of the modules in the apparatus 900 are intended to implement corresponding operations of the method on the second server side in the foregoing method embodiment, and therefore can also implement beneficial effects in the foregoing method embodiment. For brevity, details are not described herein.

It should be further understood that in this embodiment, the server switching apparatus 900 is presented in a form of a functional module. The "module" herein may be an application-specific integrated circuit ASIC, a circuit, a processor and a memory that execute one or more software or firmware programs, an integrated logic circuit, and/or another component that can provide the foregoing functions. In a simple embodiment, a person skilled in the art may figure out that the server switching apparatus 900 may be in a form shown in FIG. 3. The transceiver module 910 may be implemented by the transceiver 303 shown in FIG. 3. Specifically, a processor is implemented by executing a computer program stored in a memory. In one embodiment, when the apparatus 900 is the chip, a function and/or an implementation process of the transceiver module 910 may alternatively be implemented by a pin, a circuit, or the like. In one embodiment, the memory is a storage unit in the chip, for example, a register or a cache. The storage unit may alternatively be a storage unit, such as the memory 302 shown in FIG. 3, that is in the computer device and that is located outside the chip. A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 10:
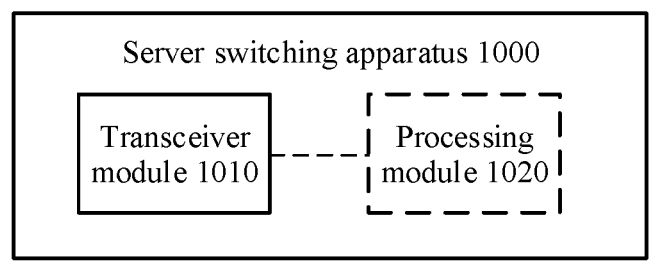
FIG. 10 is a schematic structural diagram of a server switching apparatus according to still another embodiment of this application.

FIG. 10 is a schematic structural diagram of a server switching apparatus 1000 according to still another embodiment of this application. In one embodiment, the apparatus 1000 may be a terminal, or may be a chip in the terminal. This is not limited in this embodiment of this application. As shown in FIG. 10, the apparatus 1000 includes:

a transceiver module 1010, configured to: receive a first notification message, where the first notification message includes an address of the second server; and send to-be-sent service data to the first server and the second server based on the first notification message; where the transceiver module 1010 is further configured to receive downlink data from the first server;

the transceiver module 1010 is further configured to: obtain data processing indication information; and when obtaining the data processing indication information, send the to-be-sent service data to the second server; and the transceiver module 1010 is further configured to receive downlink data from the second server.

In one embodiment, the apparatus 1000 further includes a processing module 1020, configured to: when the data processing indication information is obtained, stop sending the to-be-sent service data to the first server.

In one embodiment, when obtaining the data processing indication information, the transceiver module 1010 is further configured to: send a disconnection message to the first server, where the disconnection message is used to instruct the first server to no longer send downlink data to the terminal.

In one embodiment, that the transceiver module 1010 is configured to receive the first notification message specifically includes: receiving the first notification message from a control function entity, where the first notification message further includes duration of a timer. Correspondingly, that the transceiver module 1010 is configured to obtain the data processing indication information specifically includes: obtaining the data processing indication information based on the first notification message, where the data processing indication information is used to indicate that the duration of the timer elapses.

In one embodiment, that the transceiver module 1010 is configured to obtain the data processing indication information specifically includes: receiving the data processing indication information from a control function entity.

In one embodiment, that the transceiver module 1010 is configured to obtain the data processing indication information specifically includes: receiving the data processing indication information from the second server.

It should be understood that the apparatus 1000 according to this embodiment of this application may be corresponding to the method on the terminal side in the foregoing method embodiment, and the foregoing and other management operations and/or functions of the modules in the apparatus 1000 are intended to implement corresponding operations of the method on the terminal side in the foregoing method embodiment, and therefore can also implement beneficial effects in the foregoing method embodiment. For brevity, details are not described herein.

It should be further understood that in this embodiment, the apparatus 1000 is presented in a form of a functional module. The "module" herein may be an application-specific integrated circuit ASIC, a circuit, a processor and a memory that execute one or more software or firmware programs, an integrated logic circuit, and/or another component that can provide the foregoing functions. In a simple embodiment, a person skilled in the art may figure out that the apparatus 1000 may be a form shown in FIG. 3. The processing module 1020 may be implemented by the processor 301 and the memory 302 shown in FIG. 3. The transceiver module 1010 may be implemented by the transceiver 303 shown in FIG. 3. Specifically, a processor is implemented by executing a computer program stored in a memory. In one embodiment, when the apparatus 1000 is the chip, a function and/or an implementation process of the transceiver module 1010 may alternatively be implemented by a pin, a circuit, or the like. In one embodiment, the memory is a storage unit in the chip, for example, a register or a cache. The storage unit may alternatively be a storage unit, such as the memory 302 shown in FIG. 3, that is in the terminal and that is located outside the chip. A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Unless otherwise specified, an expression used in this application similar to an expression that "an item includes at least one of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C. The foregoing uses three elements A, B, and C as an example to describe an optional case of the item. When the expression is "the item includes at least one of the following: A, B, . . . , and X", in other words, more elements are included in the expression, a case to which the item is applicable may also be obtained according to the foregoing rule.

It should be further understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications system, comprising:
a control function entity, configured to determine a second server; and send a first notification message to a terminal, the first notification message comprises an address of the second server, and the first notification message instructing the terminal to send service data to a first server and the second server; and
the second server, configured to receive the service data from the terminal; send a second notification message to the control function entity based on a reception status of the service data;
the control function entity, further configured to send data processing indication information to the terminal when an amount of uplink data from the terminal to the second server has satisfied a predefined condition, the data processing indication information instructs the terminal to release a connection to the first server; and
the second server, further configured to send downlink data to the terminal.

2. The communications system according to claim 1, wherein the control function entity is further configured to: receive a trigger message from the first server, the trigger message instructs the control function entity to perform server switching for the terminal; and determine the second server based on the trigger message.

3. The communications system according to claim 1, the control function entity is further configured to determine the second server based on at least one of: location information of the terminal, information about a gateway to which the terminal belongs, network information, or server load information.

4. The communications system according to claim 1, wherein the second server is further configured to determine the amount of uplink data on the second server that comes from the terminal has satisfied the predefined condition.

5. The communications system according to claim 1, wherein the first notification message includes a duration of a timer, wherein the duration of the timer indicates a duration of time elapse after which the terminal is to send the service data to the second server.

6. The communications system according to claim 1, wherein the data processing indication information indicates that the second server is capable of controlling the terminal.

7. A server switching method, the method comprising:
determining, by a control function entity, a second server;
sending, by the control function entity, a first notification message to a terminal, wherein the first notification message comprises an address of the second server, and the first notification message instructs the terminal to send service data to a first server and the second server;
receiving, by the second server, service data from the terminal;
sending, by the second server, a second notification message to the control function entity based on a reception status of the service data; and
sending, by the control function entity, data processing indication information to the terminal when an amount of uplink data from the terminal to the second server has satisfied a predefined condition, wherein the data processing indication information instructs the terminal to release a connection to the first server.

8. The server switching method according to claim 7, further comprising:
receiving, by the control function entity, a trigger message from the first server, wherein the trigger message instructs the control function entity to perform server switching for the terminal; and
determining the second server based on the trigger message.

9. The server switching method according to claim 7, further comprising:
determining, by the second server, based on at least one of: location information of the terminal, information about a gateway to which the terminal belongs, network information, or server load information.

10. The server switching method according to claim 7, further comprising:
determining, by the second server, the amount of uplink data on the second server that comes from the terminal has satisfied the predefined condition.

11. A control function entity, comprising:
at least one processor, and a memory storing computer-executable instructions, which when executed by the at least one processor, cause the control function entity to:
determine a second server;
send a first notification message to a terminal, wherein the first notification message comprises an address of the second server, and the first notification message instructs the terminal to send service data to a first server and the second server;
receive, by the control function entity, a second notification message from the second server; and
send, by the control function entity, data processing indication information to the terminal when an amount of uplink data from the terminal to the second server has satisfied a predefined condition, wherein the data processing indication information instructs the terminal to release a connection to the first server.

12. The control function entity according to claim 11, wherein the sending, by the control function entity, data processing indication information to the terminal comprises:
sending, by the control function entity, the data processing indication information to the terminal based on the second notification message from the second server.

13. The control function entity according to claim 11, wherein the computer-executable instructions instruct the control function entity to:
send the data processing indication information to the terminal according to a locally configured or preconfigured policy.

14. The control function entity according to claim 11, wherein the computer-executable instructions instruct the control function entity to:
receive a trigger message from the first server, wherein the trigger message instructs to perform server switching for the terminal; and
determine the second server based on the trigger message.

15. The control function entity according to claim 11, wherein the computer-executable instructions instruct the control function entity to: determine the second server based on at least one of: location information of the terminal, information about a gateway to which the terminal belongs, network information, or server load information.

16. A server switching method, the method comprising:
determining, by a control function entity, a second server;
sending, by the control function entity, a first notification message to a terminal, wherein the first notification message comprises an address of the second server, and the first notification message instructs the terminal to send service data to a first server and the second server;

receiving, by the control function entity from the second server, a second notification message, wherein the second notification message is sent based on a reception status of the service data; and sending, by the control function entity, data processing indication information to the terminal when an amount of uplink data from the terminal to the second server has satisfied a predefined condition, wherein the data processing indication information instructs the terminal to release a connection to the first server.

17. The server switching method according to claim 16, further comprising:

receiving, by the control function entity, a trigger message from the first server, wherein the trigger message instructs the control function entity to perform server switching for the terminal; and determining the second server based on the trigger message.

18. The server switching method according to claim 16, further comprising:

determining, by the second server, based on at least one of: location information of the terminal, information about a gateway to which the terminal belongs, network information, or server load information.

* * * * *